(12) United States Patent
Hallett

(10) Patent No.: US 6,874,757 B2
(45) Date of Patent: Apr. 5, 2005

(54) PIGGING BALL VALVE

(76) Inventor: Thomas A. M. Hallett, Suite #3, 9804-112 Street, Edmonton, Alberta (CA), T5K 1L4

( * ) Notice: Subject to any disclaimer, the term of this patent is extended or adjusted under 35 U.S.C. 154(b) by 146 days.

(21) Appl. No.: 10/305,919

(22) Filed: Nov. 26, 2002

(65) Prior Publication Data

US 2004/0099835 A1 May 27, 2004

(51) Int. Cl.[7] .................................................. F16K 5/06
(52) U.S. Cl. ................................... 251/292; 251/315.08
(58) Field of Search ............................ 257/292, 315.08, 257/308

(56) References Cited

U.S. PATENT DOCUMENTS

| | | | | |
|---|---|---|---|---|
| 2,741,138 A | * | 4/1956 | Bennett | 251/315.08 |
| 3,038,489 A | * | 6/1962 | Allen | 251/315.08 |
| 3,284,046 A | * | 11/1966 | Allenbaugh, Jr. | 251/315.08 |
| 3,501,128 A | * | 3/1970 | Pool | 251/315.08 |
| 3,589,674 A | * | 6/1971 | Jones | 251/315.08 |
| 3,940,107 A | * | 2/1976 | Allenbaugh, Jr. | 251/315.08 |
| 4,113,229 A | * | 9/1978 | Fujiwara | 251/315.08 |
| 4,345,738 A | * | 8/1982 | Ripert | 251/292 |
| 5,752,690 A | | 5/1998 | Ellett | 251/152 |

* cited by examiner

*Primary Examiner*—John Bastianelli
(74) *Attorney, Agent, or Firm*—Frank J. Dykas; Dykas, Shaver & Nipper

(57) ABSTRACT

A pigging ball valve with a ball core mounted on an improved trunnion mounting. The pigging ball valve has a valve housing with a longitudinal axis. A side entry port on the valve housing is provided for entry of pigs into the valve housing. The ball core has an interior bore and is mounted on a trunnion in the valve housing for rotation about a transverse axis to the longitudinal axis of the ball core. The trunnion is a rotating stem journalled in the valve housing and connected to the ball core by a non-cylindrical portion and a cylindrical portion extending from the non-cylindrical portion towards the interior bore of the ball core. Preferably, the cylindrical portion terminates inwardly in a curved portion fitting the interior bore of the ball core.

4 Claims, 1 Drawing Sheet

PIGGING BALL VALVE

PRIORITY

This application claims the priority date of the Canadian Patent Application number 2,406,478 entitled Pigging Ball Valve filed by Thomas A. M. Hallett in Canada on Nov. 6, 2002.

BACKGROUND OF THE INVENTION

As shown in U.S. Pat. No. 5,752,690 issued May 19, 1998, a conventional pigging ball valve includes a trunnion mounted ball core. One trunnion is formed of a rotating stem by which the ball core may be rotated. The rotating stem is located on the ball core using a hexagonal head, which turns the ball core as the rotating stem is rotated. The rotating stem also acts as part of the trunnion feature of the ball valve and holds the ball core under pressure.

While this design of the pigging ball valve does work, the hexagonal head is used to perform two functions and is difficult to build such that it accomplishes both functions optimally.

SUMMARY OF THE INVENTION

There is therefore providing a pigging ball valve with a ball core mounted on an improved trunnion. The pigging ball valve has a valve housing with a longitudinal axis. A side entry port on the valve housing is provided for entry of pigs into the valve housing. The ball core has an interior bore and is mounted on a trunnion in the valve housing for rotation about a transverse axis to the longitudinal axis of the ball core. The trunnion is a rotating stem journalled in the valve housing and is connected to the ball core by a non-cylindrical portion and a cylindrical portion extending from the non-cylindrical portion towards the interior bore of the ball core. Preferably, the cylindrical portion terminates inwardly in a curved portion fitting the interior bore of the ball core.

BRIEF DESCRIPTION OF THE DRAWINGS

There will now be described preferred embodiments of the invention, with reference to the drawing, by way of illustration, in which like numerals denote like elements and in which the sole figure is a cross-section through a pig valve assembly according to the invention.

DETAILED DESCRIPTION OF PREFERRED EMBODIMENTS

Figure 1:
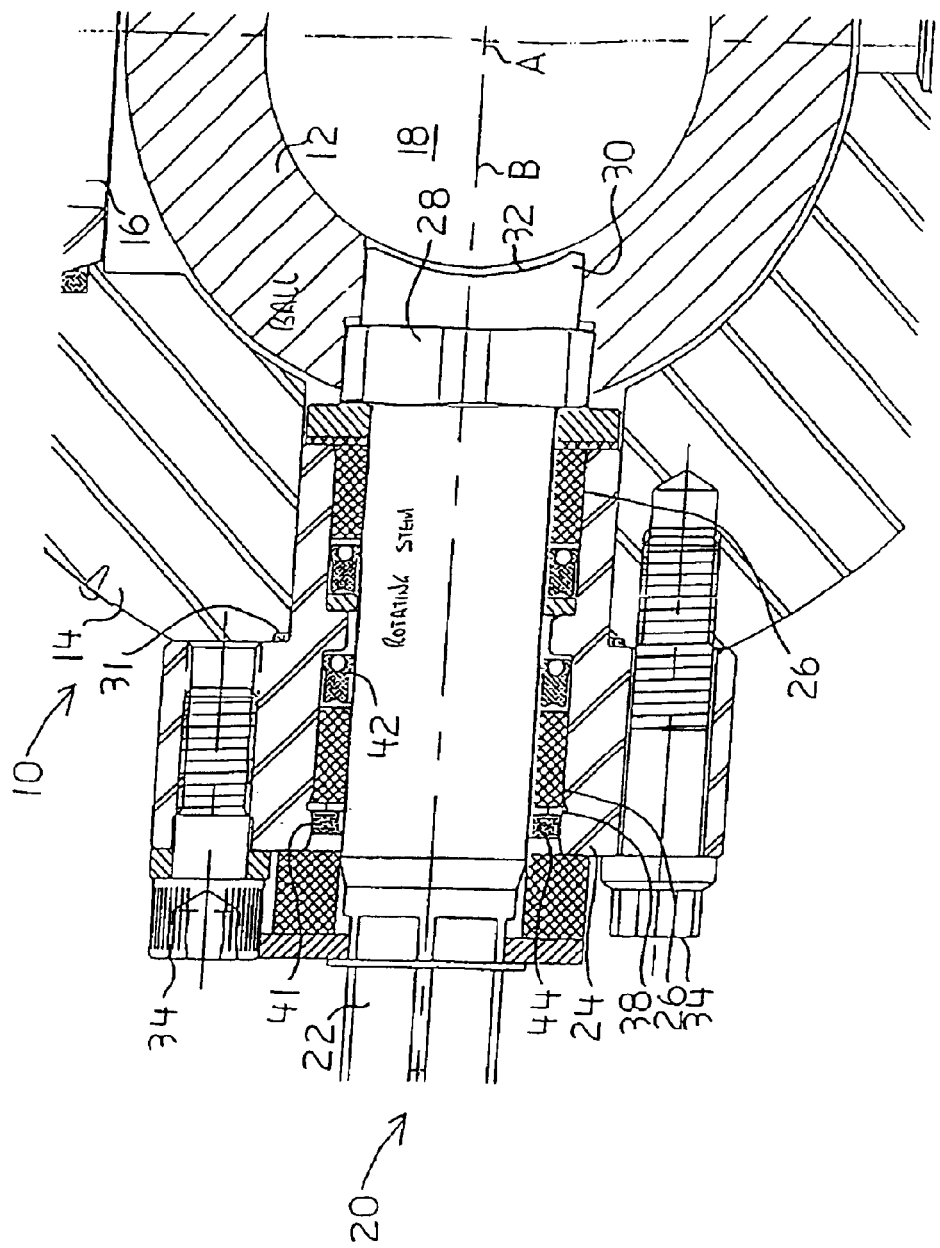

In this patent document, the word comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements. The diameter of a non-round element is the diameter of the smallest circle that circumscribes the element.

In FIG. 1, there is shown a pigging ball valve 10 with a ball core 12 mounted on an improved trunnion mounting. The pigging ball valve 10 has a valve housing 14 with a longitudinal axis A that in use corresponds to the direction of fluid flow in a pipe on which the ball valve is installed.

A side entry port 16 on the valve housing 14 is provided for entry of pigs into the valve housing 14. The ball core 12 has an interior bore 18 and is mounted on a trunnion 20 at one side of the valve housing 14 and a corresponding trunnion on the other side of the valve housing 14. The corresponding trunnion may be designed in accordance with the trunnion shown in FIG. 2 of U.S. Pat. No. 5,752,690, the content of which is hereby incorporated by reference where permitted by law. The ball core 12 rotates on the trunnion in the valve housing 14 about a transverse axis B to the longitudinal axis A of the ball core 12. Trunnion 20 of the trunnion pair is a rotating stem 22 journalled in the valve housing 12 within a stuffing box 24 having bearings 26. The rotating stem 22 is connected to the ball core 12 by a non-cylindrical portion 28 and a cylindrical portion 30 extending from the non-cylindrical portion towards the interior bore 18 of the ball core 12. The cylindrical portion 30 terminates inwardly in a curved portion 32 fitting the interior bore 18 of the ball core 12 (and thus is curved in one direction only). The non-cylindrical portion 28 is preferably hexagonal in cross-section but may have any shape that provides a key function. The cylindrical portion preferably has smaller cross-section than the non-cylindrical portion 28 and has approximately the same length along the axis B.

The rotating stem 22 acts as a means to rotate the ball core 12 within the valve housing 14 between a position in which the bore 18 is aligned along the pipe (as shown in FIG. 1) and a position in which the bore 18 is aligned across the pipe. The stuffing box 24 is fastened onto the valve housing 14 using four ferry capscrews 34. The stuffing box 24 is sealed to the valve housing 14 using O-ring 31. Stem 22 is journalled within the stuffing box 24 on bearings 26, secured within the stuffing box 24 by snap ring 38 and shoulder 41 and sealed using seals 42 and 44.

It is preferred to shrink fit the ball core 12 onto the cylindrical portion 30 so that the stem 22 and ball core 12 act as one component.

A person skilled in the art could make immaterial modifications to the invention described and claimed in this patent without departing from the invention.

I claim:

1. A pigging ball valve, comprising:
a valve housing having a longitudinal axis;
a side entry port on the valve housing for entry of pigs into the valve housing;
a ball core mounted on a trunnion in the valve housing for rotation about a transverse axis to the longitudinal axis, the ball core having an interior bore;
the trunnion comprising a rotating stem journalled in the valve housing; and
the trunnion being connected inside the ball core by a non-cylindrical portion ahd a cylindrical portion extending from the non-cylindrical portion towards the interior bore of the ball core and in which the cylindrical portion terminates inwardly in a curved portion fitting the interior bore of the ball core.

2. The pigging ball valve of claim 1 in which the non-cylindrical portion is hexagonal in cross-section.

3. The pigging ball valve of claim 1 in which the cylindrical portion has smaller diameter than the non-cylindrical portion.

4. The pigging ball valve of claim 1 in which the non-cylindrical portion and the cylindrical portion have the same length in the direction of the transverse axis.

* * * * *